United States Patent [19]

Azuma

[11] 4,274,390
[45] Jun. 23, 1981

[54] AUTOMOTIVE HOT WATER HEATER

[76] Inventor: Shinsuke Azuma, 6020 Lindley Ave., Encino, Calif. 91316

[21] Appl. No.: 21,599

[22] Filed: Mar. 19, 1979

[51] Int. Cl.³ .............................................. F24B 1/00
[52] U.S. Cl. .............................. 126/19.5; 237/12.3 B
[58] Field of Search .................. 126/19.5, 261, 56, 57; 165/51; 237/12.3 B; 60/320, 137.4

[56] References Cited

U.S. PATENT DOCUMENTS

| | | | |
|---|---|---|---|
| 1,616,792 | 2/1927 | Gerlinger | 237/12.3 B |
| 1,757,448 | 5/1930 | Cooper | 126/19.5 |
| 2,255,354 | 9/1941 | Hackerd | 237/12.3 B |
| 2,467,156 | 4/1949 | Sala | 126/19.5 X |
| 2,894,265 | 7/1959 | Reardon | 126/19.5 X |
| 3,148,675 | 9/1964 | Menuto | 126/19.5 |
| 3,276,634 | 6/1966 | Arnot | 237/12.3 B X |

*Primary Examiner*—Samuel Scott
*Assistant Examiner*—Randall L. Green
*Attorney, Agent, or Firm*—William C. Babcock

[57] ABSTRACT

Disclosed herein is a water heating and dispensing system adapted for use in an automobile, utilizing an exhaust pipe heated coil for the heat transfer. To accommodate the varying levels of exhaust heat the coil is adjustable in its position relative the pipe, thus providing varying amounts of heat transfer. Included further is a pressure regulating valve for releasing any in the system steam and a dispensing assembly for dispensing both cold and hot water. Also included are various electrically operated indicating lights and control inputs for indicating the heat range to which the water is to be brought up. In the normal mode, i.e. during the time when water is not dispensed, the hot water circuit is connected in a recirculation mode, the normal convective currents in the water providing sufficient circulation to exchange heat. The dispensing assembly, furthermore, includes an enclosed cavity in which cups may be placed, thus retaining the cups against inadvertent spillage.

4 Claims, 15 Drawing Figures

U.S. Patent   Jun. 23, 1981   Sheet 1 of 4   4,274,390
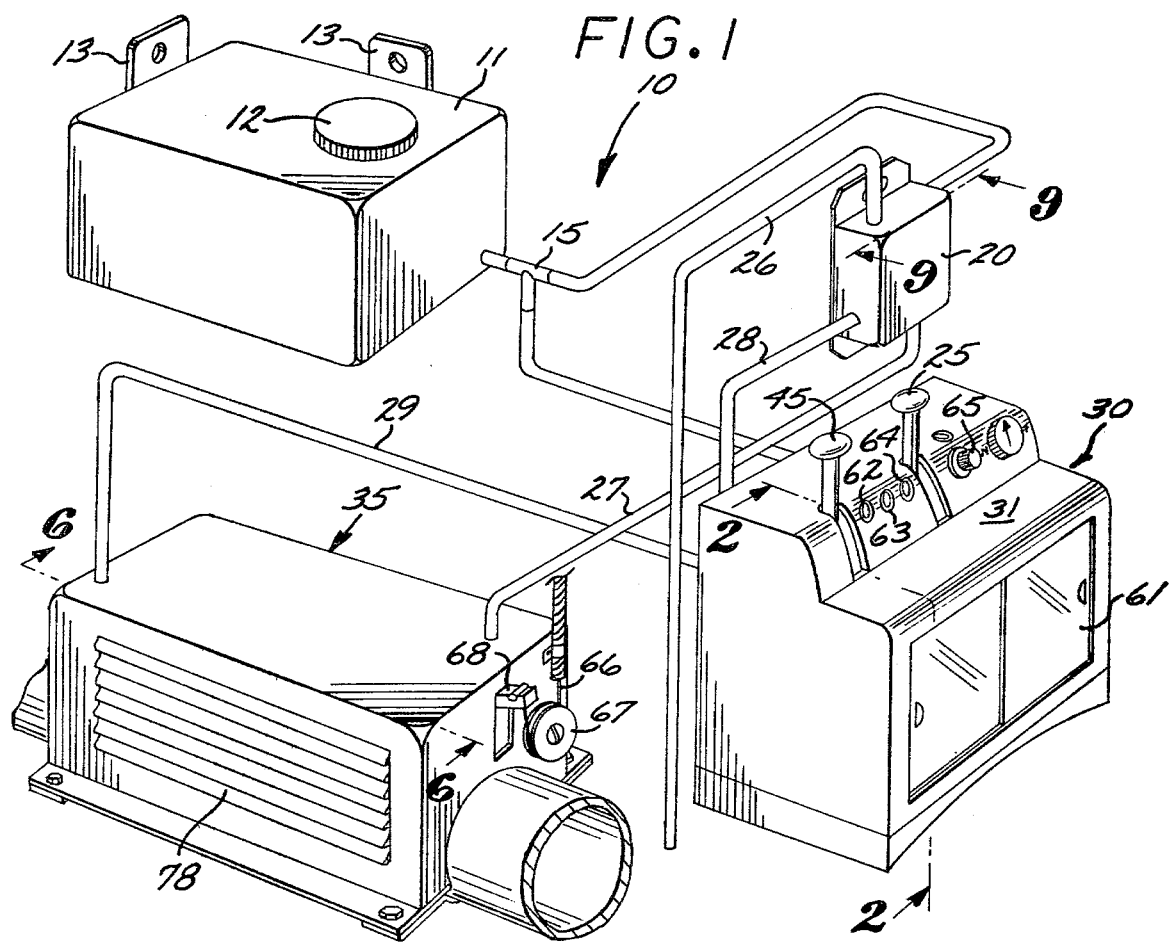
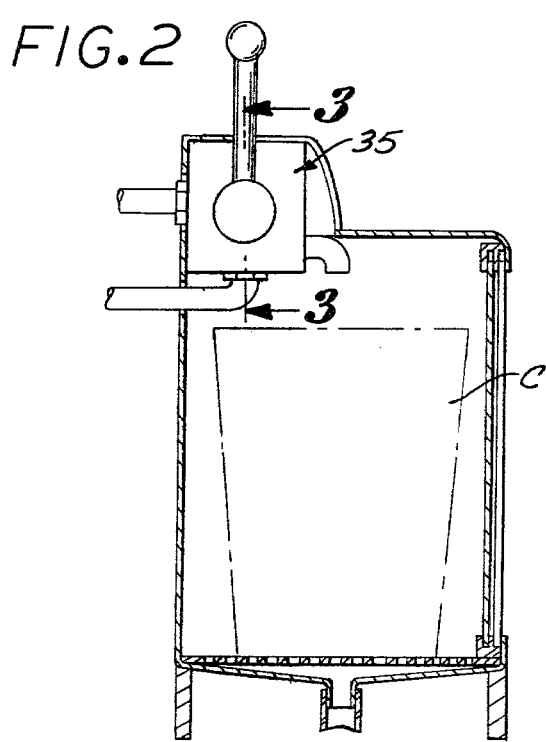
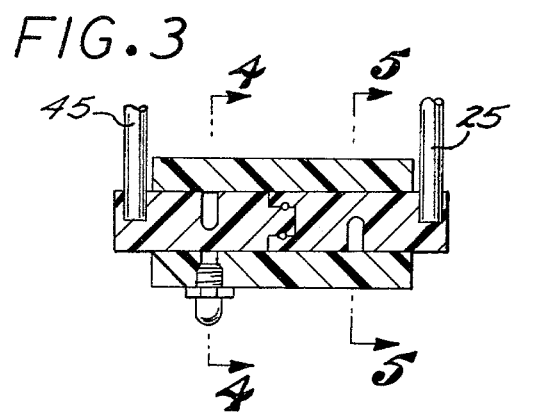
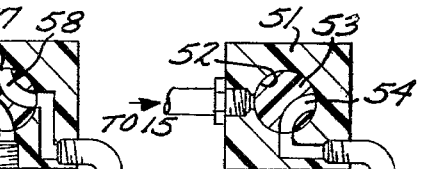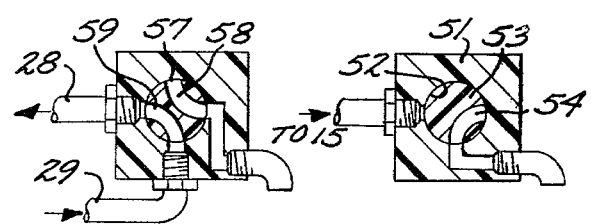

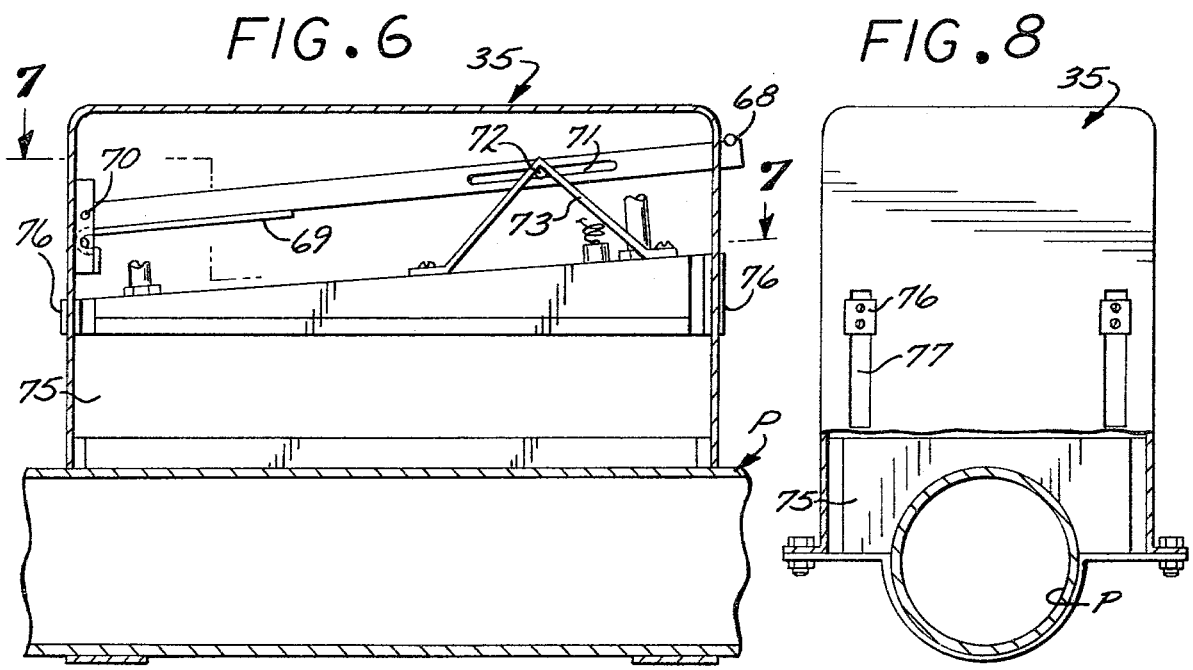
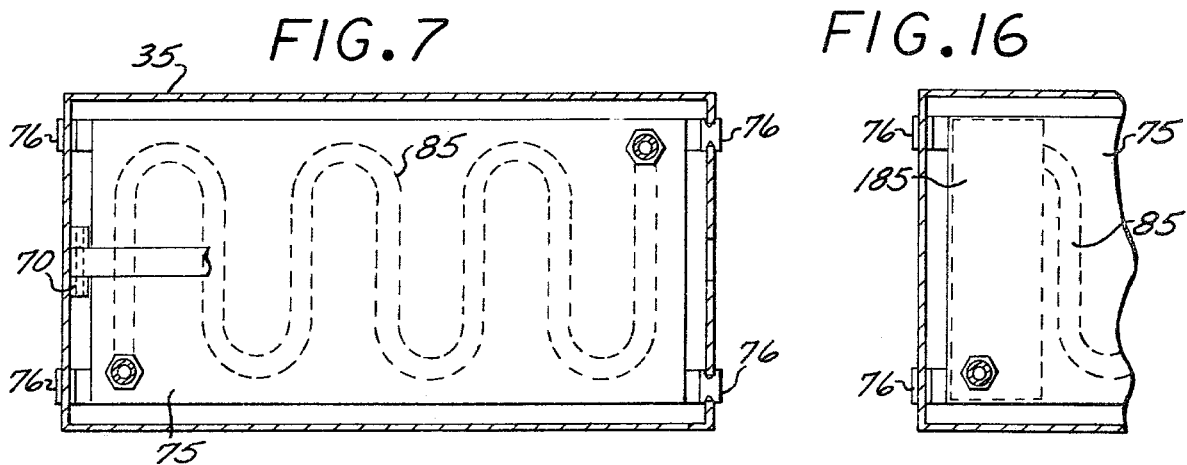
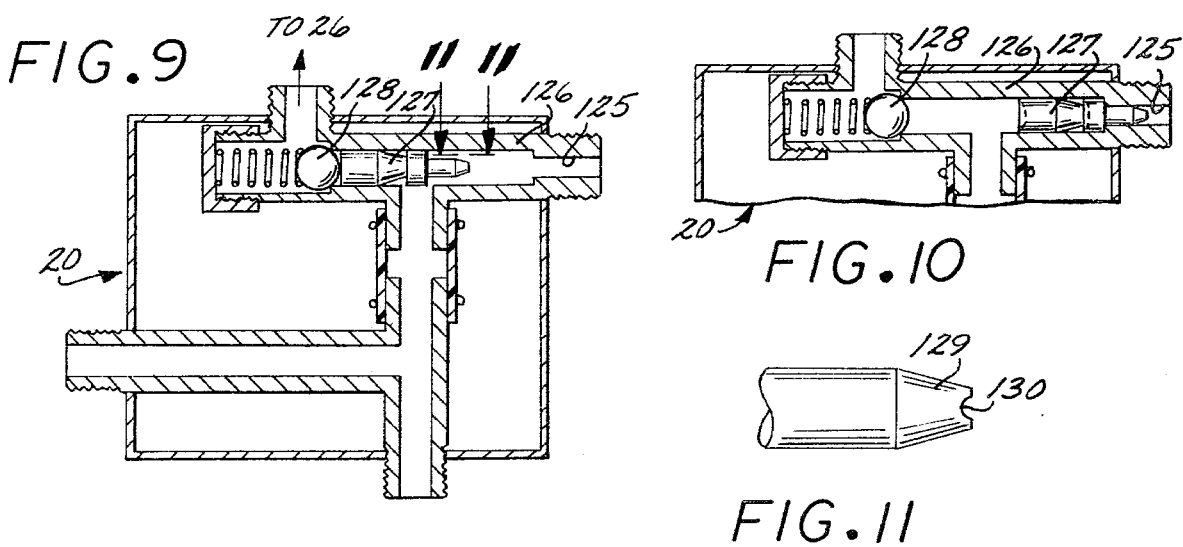
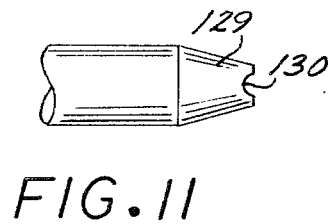

AUTOMOTIVE HOT WATER HEATER

BACKGROUND OF THE INVENTION

1. Field of the Invention

The present invention relates to hot water heating devices, and more particularly to heating devices adapted to recover heat out of the exhaust pipes of an automobile.

2. Description of the Prior Art

Hot water heaters adapted for use in automobiles have been known in the past. Hot water heaters of the prior kind either utilized the electrical power generated during the course of operating an automobile or recovered heat dissipated by the exhaust system. In most instances the use of electrical power, particularly in the amounts necessary to heat large volumes of water, entails an additional load on the engine, thus increasing fuel consumption and wear. For this reason the use of the free heat dissipated in the exhaust has been preferred, such heat losses heretofor being normally wasted or not recoverable. The disadvantage of using such prior art exhaust heated warmers is the lack of control over the temperature reached, resulting in a condition which may lead to steam explosion. This last danger is particularly pronounced since most of the prior art exhaust heated systems do not include any provisions for modifying the heat input to the heater coils or to replenish water lost as steam. Thus, under situations where large amounts of heat are generated in the exhaust pipe, e.g., during the course of a long uphill climb, the prior art exhaust systems, even if correctly sized for normal operation, will lack the requisite safety margin for such additional heat inputs. The danger of overheating water is therefore always present in such exhaust heated systems, either requiring elaborate safety provisions, or precluding the use thereof because of products liability considerations.

SUMMARY OF THE INVENTION

Accordingly, it is the general purpose and object of the present invention to provide an exhaust heated water dispensing system having as one of its features the adjustment of the rate of heat transfer to the heating coils.

Yet further objects of the invention are to provide an exhaust heated water dispensing system which, when not dispensing, will circulate the heated water by convective currents.

Yet additional objects of the invention are to provide an exhaust heated water dispensing system having associated therewith a dispenser of cold water.

Briefly these and other objects are accomplished within the present invention by providing a storage container which may be replenished with fresh water for human consumption, the storage container communicating, by gravity, with a pressure relief assembly for the venting of steam. The pressure relief assembly also includes the provisions for transferring water from the storage container to replace the water lost in steam or dispensed. In its passive state the relief assembly sets up a circulation path across a set of heating coils placed in a housing clamped to the exhaust pipe of the vehicle. The housing includes a cable actuated lifting assembly which supports the heating coils at selected separation increments depending on the heat input generated by the pipes. Thus, if it is found that excessive temperatures are being produced in the course of operation it is possible to increase the separation between the heating coils and the pipe, exposing the coils to the flow of ambient air and thereby reducing the rate of heat exchange. In this manner safe temperature levels may be maintained, as indicated by a plurality of indicating lights which give a visual cue of either too low a heat input, correct heat range, or an overheating state. These temperature indicators may be placed on a dispensing assembly deployed in the cab of the automobile, the dispensing assembly being connected in the circulation loop around the heating coils. To allow the release of hot or cold water the dispensing assembly has two rotary selector valves, one for releasing cold water directly from the storage container and the other for selecting between a circulating path and a dispensing path across the heating coils.

By virtue of this combination of parts it is thus possible to achieve an exhaust heated water dispensing system which both includes the requisite venting of steam and the requisite wear recharge during the periodic cool downs when the automobile is stopped. This system further includes the desired adjustment features for selecting the rate of heat transfer to match the exhaust temperature levels generated in the automobile.

BRIEF DESCRIPTION OF THE DRAWINGS

FIG. 1 is a perspective illustration of an exhaust heated water dispensing system constructed according to the invention herein;

FIG. 2 is a sectional view taken along line 2—2 of FIG. 1, illustrating a section of the dispensing portion of the system disclosed herein;

FIG. 3 is yet another sectional view taken along line 3—3 of FIG. 2 illustrating a selector valve useful herein;

FIG. 4 is a sectional view taken along line 4—4 of FIG. 3 illustrating a selector position of the hot water dispensing path according to the invention described herein;

FIG. 5 is a sectional view taken along line 5—5 of FIG. 3 illustrating the cold water dispensing arrangement useful herein;

FIG. 6 is a sectional view of an adjustable heat exchange system useful with the invention herein;

FIG. 7 is a top view taken along the line 7—7 of FIG. 6;

FIG. 8 is an end view of the heat exchanger shown in FIG. 6;

FIG. 9 is a sectional view of a mixing and release valve assembly useful with the invention herein;

FIG. 10 is a detail view, in section of the mixing and relief valve assembly shown in FIG. 9, illustrating one mode of operation thereof;

FIG. 11 is a detail view, taken along line 11—11 of FIG. 9;

FIG. 13 is a first implementation of a sensing circuit useful with the invention herein;

DESCRIPTION OF THE SPECIFIC EMBODIMENT

Figure 12:
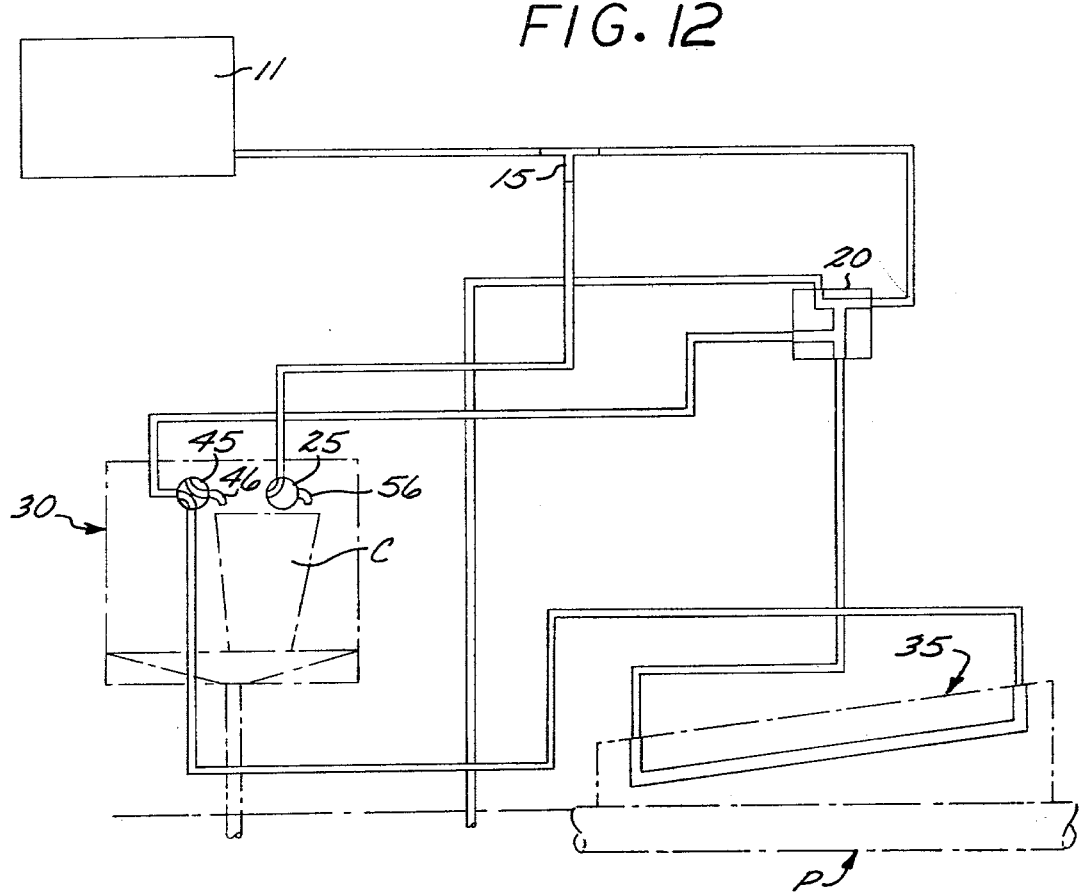
FIG. 12 is a piping diagram of the inventive exhaust heated water dispensing system according to the invention described herein.

As shown in FIGS. 1 and 12, the inventive exhaust heated water dispensing system, generally designated by the numeral 10, includes a water tank or reservoir 11 provided with a fill cap 12 for periodic replenishment and mounting tabs 13 for attachment to any convenient surface in the automobile. Reservoir 11, proximate the lower surface thereof, includes an outlet connected to a tee 15 which in one direction is connected to one fitting of a relief and replenishment valve assembly 20 and along the other path connects to a selector valve 25 placed on the interior of a dispenser 30. Valve assembly 20 includes at one output thereof a relief vent conduit 26, another output thereof being connected to one end of a heat exchanger assembly 35 by way of a conduit 27 with a further output being connected by a conduit 28 to yet another dispensing valve assembly 45. Valve 45, depending on its state, either provides a connection between conduit 28 and a conduit 29 which connects to the other side of the heat exchanger 35, or dispenses hot water from the heat exchanger through a dispensing nozzle 46.

As shown in FIGS. 2–5, valves 25 and 45 are combined in a single structure, valve 25 including a housing 51 having a cylindrical bore 52 etending through the interior thereof, bore 52 communicating proximate one end thereof to the tee connection 15. Received on the interior of bore 52 and extending partly therethrough is a valve body 53, again cylindrical in shape and conformed for sealing engagement with the interior surfaces of the bore. Valve body 53 includes an arcuate passage 54 which, in one position connects the tee 15 with a dispensing nozzle 56 for dispensing cold water. Similarly nozzle 46 in the hot water valve 45 is enabled by yet another valve body 57, once more, received on the interior of bore 52, valve body 57 engaging valve body 53 by a cylindrical projection for axial alignment. More specifically, valve body 57 includes two arcuate passages 58 and 59, passage 59 in one position providing circuit continuity between conduit 28 and conduit 29. In a second position, passage 58 provides continuity between conduits 29 and nozzle 46. Thus either recirculation of the hot water is established or the hot water is dispensed through nozzle 46 into any convenient container.

The foregoing integrated assembly of valves 25 and 45 is installed on the interior of the dispenser 30. More specifically, dispenser 30 comprises a hollow housing 31 provided with a sliding door 61 which may be translucent, door 61 retaining any cups C beneath the corresponding nozzles. Thus hot water may be safely dispensed with the vehicle in motion and should steam be inadvertently released in the course of dispensing the door will block the direct impingement thereof against the occupants. The housing 31 further includes a low temperature light 62, a normal range light 63 and a high temperature light 64, all exposed to the view of the driver, the lights being aligned with a control knob 65 for adjustment.

More specifically, knob 65 controls the extension of a cable 66 which, across a pulley 67, articulates an arm 68 extending from the heat exchange assembly 35. As shown in more detail in FIGS. 6, 7 and 8, arm 68 is spring loaded to oppose the draw of the cable, the spring bias being provided by a leaf spring 69 fixed at the pivot 70. Arm 68 is further provided with a slot 71 in which a pin 72 is translated, pin 72 supporting a frame 73 which, in turn, is connected to a coil assembly 75. Assembly 75 is provided with guides 76 extending through vertical slots 77, thus allowing for a displacing translation thereof relative an adjacent segment of an exhaust pipe P. Accordingly, any desired increment of separation between the coil assembly 75 and pipe P may be activated, louvers 78 thus setting a selected heat transfer rate to the coil assembly. Assembly 75 thus exposes a coil segment 85 to the desired heat input rate which may be controlled down as the desired temperature range is achieved.

The correct heat range is indicated by either the under or over temperature lights 62 or 64. More specifically, as shown in FIG. 13, light 62 is connected in series with a silicon controlled rectifier 101 gated by an emitter follower circuit around a transistor 102. Transistor 102 is rendered conductive by a thermistor 103 sensing a low temperature state. Light 64 is similarly SCR controlled by an SCR 105 gated by an emitter follower circuit around a transistor 106 which responds to a thermistor 107.

Figure 14:
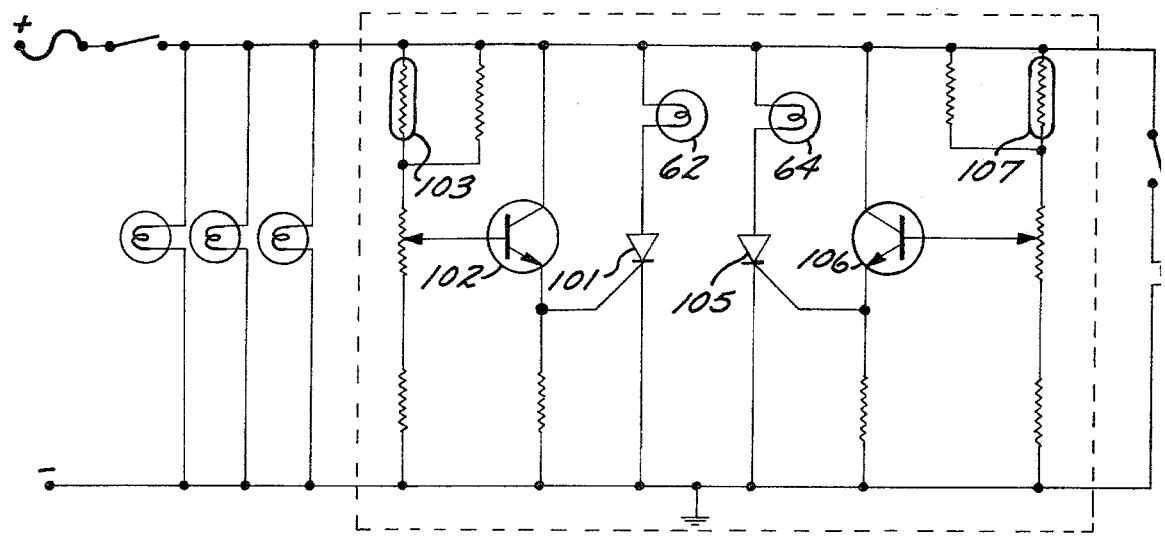
FIG. 14 is a second implementation of a sensing circuit useful with the invention herein.

In the alternative, bridge networks may be used to switch comparators which in turn light up lights 62 or 64. More specifically as shown in FIG. 14 a bridge 111 including a thermistor 112 provides one input to a comparator 113 which drives the base of a transistor 114 in circuit with the light 62. Bridge 111 may include a diode network 115 to provide the desired hysteresis. A similar bridge 116 is imbalanced by a thermistor 117 beyond the conduction of the diode network 120 to set off a comparator 118 gating a transistor 119 in circuit with light 64.

These two alternative sensing arrangements assist the user in the proper positioning of the coil assembly 75. Once positioned any accumulated steam is released through the relief assembly 20. More specificially, as shown in FIGS. 9, 10 and 11, assembly 20 receive, the stored water from the tee 15 to an inlet port 125 at the end of a valve housing 126. This water is fed by gravity against a shuttle valve 127. If the internal circuit pressure, as result of steam production, exceeds this water head, the shuttle valve 127 is pushed over to close the input port 125 (as illustrated in FIG. 10) exposing a spring-loaded relief valve 128. At that point any further steam build-up is relieved by the relief valve into conduit 26 which may be directed onto the roadway. Once relieved the replenishment process continues by the return of the shuttle valve. To assist in the alignment of the shuttle valve in port 125 the end thereof is cut on a chamfer 129 producing a tapered structure which on its end may include a transverse groove 130 to oppose rotation.

Figure 15:
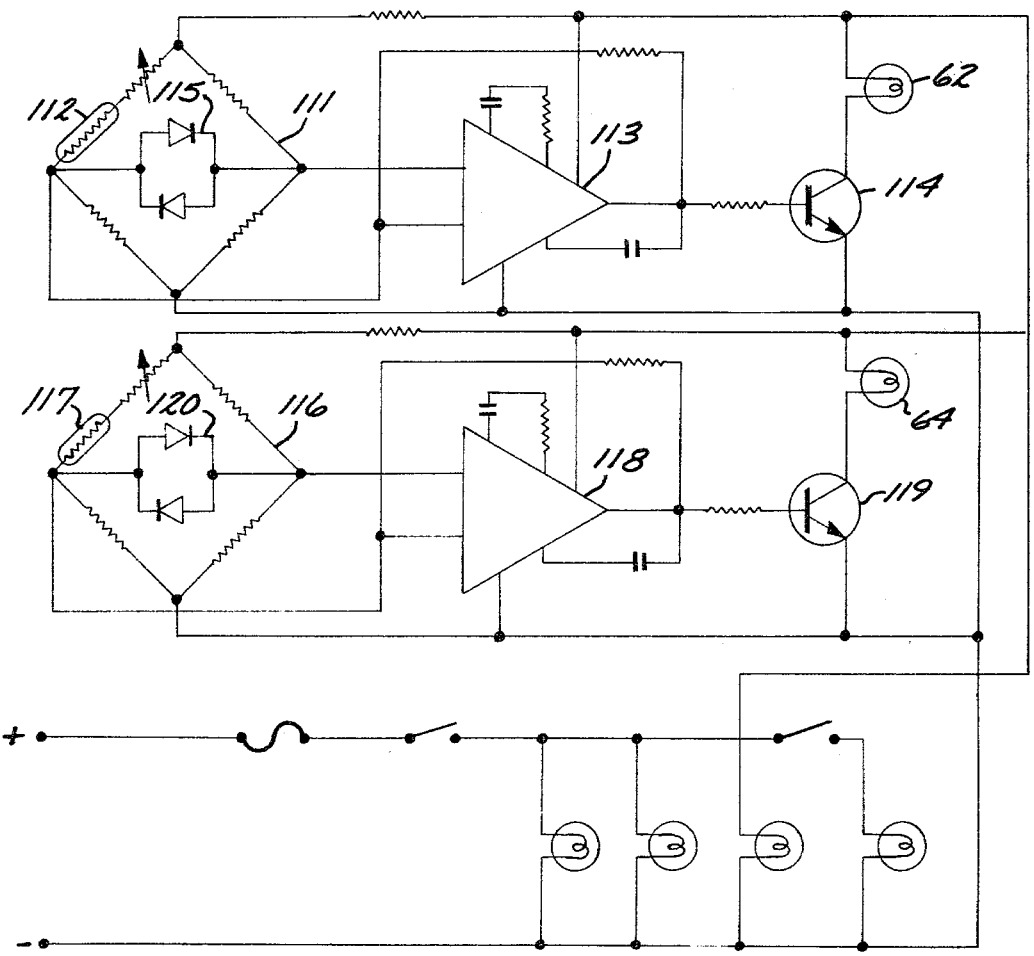
FIG. 15 is an alternative implementation of the structure shown in FIG. 7, illustrating a coil provided with a flat heating tank for increased convective transfer.

As shown in FIG. 15 coil 85 may include a rectangular tank 185 exposed for thermal transfer along with the coil, tank 185 acting as a reservoir of heated fluid to promote circulation. To improve the heat transfer characteristics thereof, both the coil 85 and the tank 185 may be made from aluminum or copper, thus providing minimal thermal resistance to the heated environment thereabout. In this form the heat levels in the housing 35 raise the water temperatures which is then advanced, by convection, towards the discharge port.

Some of the many advantages of the present invention should now be readily apparent. As illustrated, the invention provides both the function of steam release and replenishment and heat input control to allow for long periods of inattendance. This is all accomplished in a simple implementation, with reliable components and with failure modes provided for in the pressure relief.

What is claimed is:

1. A heating assembly for use in an automobile, comprising:
   a heat exchange housing adapted to be secured to an exhaust pipe of said automobile, said housing including a heating coil deployed for translation relative said pipe and pivotal support means connected to said coil for articulation thereof;
   a storage container mounted in said automobile for receiving water therein;
   pressure relief means connected to said coil and to said storage container for relieving gases under pressure in said coil and for replacing said relieved gases with water;
   dispensing means operatively connected to said coil and said storage container including dispensing valves for releasing water therefrom;
   temperature indicating means connected to sense the temperature of the water in said coil for providing a visual indication thereof; and
   manual control means connected to said pivotal support means for articulating said coil in and out of proximity of said exhaust pipe.

2. Apparatus according to claim 1 wherein said pressure relief means includes a tubular valve body conformed to receive a shuttle valve, said valve body being attached at one end to said container and at the other ends to said coil and to a relief valve, whereby pressure in said coil will operate to translate said shuttle valve to close off said container and will operate against said relief valve to effect opening thereof.

3. Apparatus according to claim 2 wherein:
   said dispensing valve includes a rotary valve having one position connected across said coil and another position connected to release the contents of said coil.

4. Apparatus according to claim 3 wherein:
   said dispensing means includes an enclosure formed to surround said dispensing valves and adapted to receive fluid receptacles subjacent thereto.

* * * * *